United States Patent
Murata et al.

(10) Patent No.: US 10,589,791 B2
(45) Date of Patent: Mar. 17, 2020

(54) VEHICLE BODY STRUCTURE

(71) Applicant: Toyota Jidosha Kabushiki Kaisha, Toyota-shi, Aichi-ken (JP)

(72) Inventors: Soshiro Murata, Nagoya (JP); Takashi Sagisaka, Miyoshi (JP); Ayaka Kagami, Inazawa (JP); Hiroki Hyodo, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 60 days.

(21) Appl. No.: 16/114,814

(22) Filed: Aug. 28, 2018

(65) Prior Publication Data

US 2019/0071128 A1 Mar. 7, 2019

(30) Foreign Application Priority Data

Sep. 5, 2017 (JP) ................. 2017-170543

(51) Int. Cl.
| B62D 24/00 | (2006.01) |
| B62D 25/02 | (2006.01) |
| B62D 27/02 | (2006.01) |
| B62D 29/00 | (2006.01) |
| B62D 25/08 | (2006.01) |
| B62D 65/02 | (2006.01) |
| B62D 25/04 | (2006.01) |

(52) U.S. Cl.
CPC ............ *B62D 24/00* (2013.01); *B62D 25/02* (2013.01); *B62D 25/025* (2013.01); *B62D 25/087* (2013.01); *B62D 27/023* (2013.01); *B62D 29/00* (2013.01); *B62D 65/02* (2013.01); *B62D 25/04* (2013.01); *B62D 29/007* (2013.01); *B62D 29/008* (2013.01)

(58) Field of Classification Search
CPC ...... B62D 24/00; B62D 25/02; B62D 25/025; B62D 25/087; B62D 27/023; B62D 29/00; B62D 65/02; B62D 25/04; B62D 29/007; B62D 29/008
See application file for complete search history.

(56) References Cited

U.S. PATENT DOCUMENTS

2015/0225020 A1* 8/2015 Kimura ................. B23K 11/11
296/29
2016/0339966 A1* 11/2016 Iwase .................... B60J 5/0469

FOREIGN PATENT DOCUMENTS

| JP | 7-126383 | * | 7/1995 |
| JP | 2001-287666 A | | 10/2001 |
| JP | 2003285772 A | * | 10/2003 |
| JP | 2005-343295 A | | 12/2005 |

* cited by examiner

*Primary Examiner* — Lori L Lyjak
(74) *Attorney, Agent, or Firm* — Dinsmore & Shohl LLP

(57) ABSTRACT

A vehicle body structure includes a first structural member, a second structural member, and a ridge portion. The first structural member has a first linear expansion coefficient and is provided with a joined portion. The second structural member has a second linear expansion coefficient exceeding the first linear expansion coefficient and is provided with a plurality of joining portions at an outer edge portion of the second structural member, and the joining portions are joined to the joined portion. The ridge portion is formed in the outer edge portion to protrude in a plane intersection direction intersecting with a joining surface of the joining portion and is continuous from one of the joining portions to another one of the joining portions.

6 Claims, 11 Drawing Sheets

| MEASUREMENT POSITION | FLOATING AMOUNT OF PRESENT EMBODIMENT [mm] | FLOATING AMOUNT OF COMPARATIVE EXAMPLE [mm] |
|---|---|---|
| P1 | 0.16 | 1.02 |
| P2 | 1.09 | 1.75 |
| P3 | 1.46 | 1.83 |
| P4 | 1.08 | 1.59 |
| P5 | 0.65 | 0.79 |

VEHICLE BODY STRUCTURE

CROSS-REFERENCE TO RELATED APPLICATIONS

This application claims priority to Japanese Patent Application No. 2017-170543 filed on Sep. 5, 2017, which is incorporated herein by reference in its entirety including the specification, drawings and abstract.

BACKGROUND

1. Technical Field

The disclosure relates to a vehicle body structure.

2. Description of Related Art

Japanese Unexamined Patent Application Publication No. 2005-343295 (JP 2005-343295 A) discloses a structure in which a plurality of projecting ribs (beads) extending in the front-rear direction of a vehicle body is integrally provided in a flange portion of a roof panel made of an aluminum alloy such that the projecting ribs are spaced apart from each other in the front-rear direction of the vehicle and the flange portion and a side member outer panel are joined to each other at the non-rib flat part of the flange portion.

SUMMARY

A vehicle body structure has a first structural member that is provide with a joined portion and a second structural member that has a linear expansion coefficient exceeding the linear expansion coefficient of the first structural member and is provided with a plurality of joining portions joined to the joined portion. In the above-described vehicle body structure, the second structural member may float with respect to the first structural member due to the difference in linear expansion coefficient at a time when heating is performed in, for example, a post-painting drying treatment. Conceivable is a structure in which floatation of the second structural member is suppressed by rib formation in the second structural member as in JP 2005-343295 A.

However, in a structure in which a plurality of ribs is formed in the second structural member with a joining part avoided as in JP 2005-343295 A, the joining portion and the peripheral portion of the joining portion as parts where a bending moment attributable to thermal stress is the largest are not stiffened. In other words, in the vehicle body structure in which the linear expansion coefficient of the second structural member that has the joining portions exceeds the linear expansion coefficient of the first structural member that has the joined portion, there is room for improvement in suppressing floatation of the second structural member.

The disclosure provides a vehicle body structure with which floatation of a second structural member can be suppressed in a vehicle body structure in which the linear expansion coefficient of the second structural member that has a plurality of joining portions exceeds the linear expansion coefficient of a first structural member that has a joined portion.

An aspect of the disclosure relates to a vehicle body structure. The vehicle body structure includes a first structural member, a second structural member, and a ridge portion. The first structural member has a first linear expansion coefficient and is provided with a joined portion. The second structural member has a second linear expansion coefficient exceeding the first linear expansion coefficient and is provided with a plurality of joining portions at an outer edge portion of the second structural member, and the joining portions are joined to the joined portion. The ridge portion is formed in the outer edge portion to protrude in a plane intersection direction intersecting with a joining surface of the joining portion and is continuous from one of the joining portions to another one of the joining portions.

The second structural member is joined to the first structural member by the joining portions being joined to the joined portion. The second structural member has the second linear expansion coefficient exceeding the first linear expansion coefficient of the first structural member. In the vehicle body structure, the deformation amount of the second structural member exceeds the deformation amount of the first structural member once the first structural member and the second structural member are heated by painting or the like. Accordingly, the second structural member floats up with respect to the first structural member. Especially, the bending moment that acts on the joining portions exceeds the bending moment that acts on the other part. Therefore, the second structural member floats up more in the peripheral portion of the joining portion.

According to the aspect of the disclosure, the ridge portion formed in the outer edge portion to protrude in the plane intersection direction intersecting with the joining surface of the joining portion is continuous from one of the joining portions to another one of the joining portions. Accordingly, the ridge portion resists a force that acts in the linear direction in which the joining positions of the joining portions are interconnected. In other words, rigidity with respect to the force that acts in the linear direction in which the joining positions of the joining portions are interconnected is enhanced compared to a configuration lacking the ridge portion. Furthermore, the ridge portion also resists the bending moment acting on the joining portions. As a result, deformation of the second structural member in the vicinity of the joining portions is suppressed, and thus floatation of the second structural member can be suppressed in the vehicle body structure in which the linear expansion coefficient of the second structural member that has the joining portions exceeds the linear expansion coefficient of the first structural member that has the joined portion.

In the vehicle body structure according to the aspect of the disclosure, the outer edge portion may have a flange portion having a first wall and a second wall, the first wall extending to a side away from the first structural member, the second wall extending along the first structural member from a ridge line bordering the first wall toward an outside in an intersection direction intersecting with the ridge line, and the joining portions may be formed in the second wall.

According to the aspect of the disclosure, the ridge line part that forms the boundary between the first wall and the second wall as well as the ridge portion resists the force acting in the linear direction in which the joining positions of the joining portions formed in the second wall are interconnected. As a result, deformation of the second structural member in the vicinity of the joining portions is suppressed, and thus floatation of the second structural member can be suppressed.

In the vehicle body structure according to the aspect of the disclosure, the ridge portion may be formed at a part on an opposite side of the joining portion in the second wall from the ridge line.

According to the aspect of the disclosure, the ridge line part is formed on one side of the joining portions and the ridge portion is formed on the other side of the joining portions in the intersection direction intersecting with the linear direction in which the joining positions of the joining portions are interconnected. As a result, the part that resists the force acting in the linear direction in which the joining positions of the joining portions are interconnected is less likely to be biased than in a configuration in which the ridge line part and the ridge portion are formed on one side in the intersection direction, and thus deformation of the second structural member can be suppressed.

In the vehicle body structure according to the aspect of the disclosure, a part of the second wall between the joining portions may be displaced to the ridge line side from a straight line interconnecting tips of the joining portions and the ridge portion may be formed to be continuous to an edge portion of the part displaced to the ridge line side.

According to the aspect of the disclosure, the part of the second structural member between the joining portions is closer to the ridge line than the tips of the joining portions. In other words, the length from the ridge line to the edge at the part of the second wall that is not joined is shorter than the length from the ridge line to the edge in a configuration that has a part not displaced to the ridge line side, and thus floatation of the second wall can be suppressed.

In the vehicle body structure according to the aspect of the disclosure, the first structural member may be an iron frame member and the second structural member may be an aluminum side member outer panel. The iron includes an iron alloy as well as a simple iron substance. The aluminum includes an aluminum alloy as well as a simple aluminum substance.

According to the aspect of the disclosure, floatation of the aluminum side member outer panel with respect to the iron frame member is suppressed, and thus a decline in sealability between the frame member and the side member outer panel can be suppressed.

In the vehicle body structure according to the aspect of the disclosure, the first structural member may be an iron vehicle body rear portion member forming a vehicle cabin and a luggage room and the second structural member may be an aluminum partition wall member partitioning the vehicle cabin and the luggage room from each other. The iron includes an iron alloy as well as a simple iron substance. The aluminum includes an aluminum alloy as well as a simple aluminum substance.

According to the aspect of the disclosure, floatation of the aluminum partition wall member with respect to the iron vehicle body rear portion member is suppressed, and thus a decline in sealability between the vehicle body rear portion member and the partition wall member can be suppressed.

The aspect of the disclosure has the effect that floatation of a second structural member can be suppressed in a vehicle body structure in which the linear expansion coefficient of the second structural member that has a plurality of joining portions exceeds the linear expansion coefficient of a first structural member that has a joined portion.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a vehicle 10 and a vehicle body structure 50 according to a first embodiment will be described.

Figure 1:
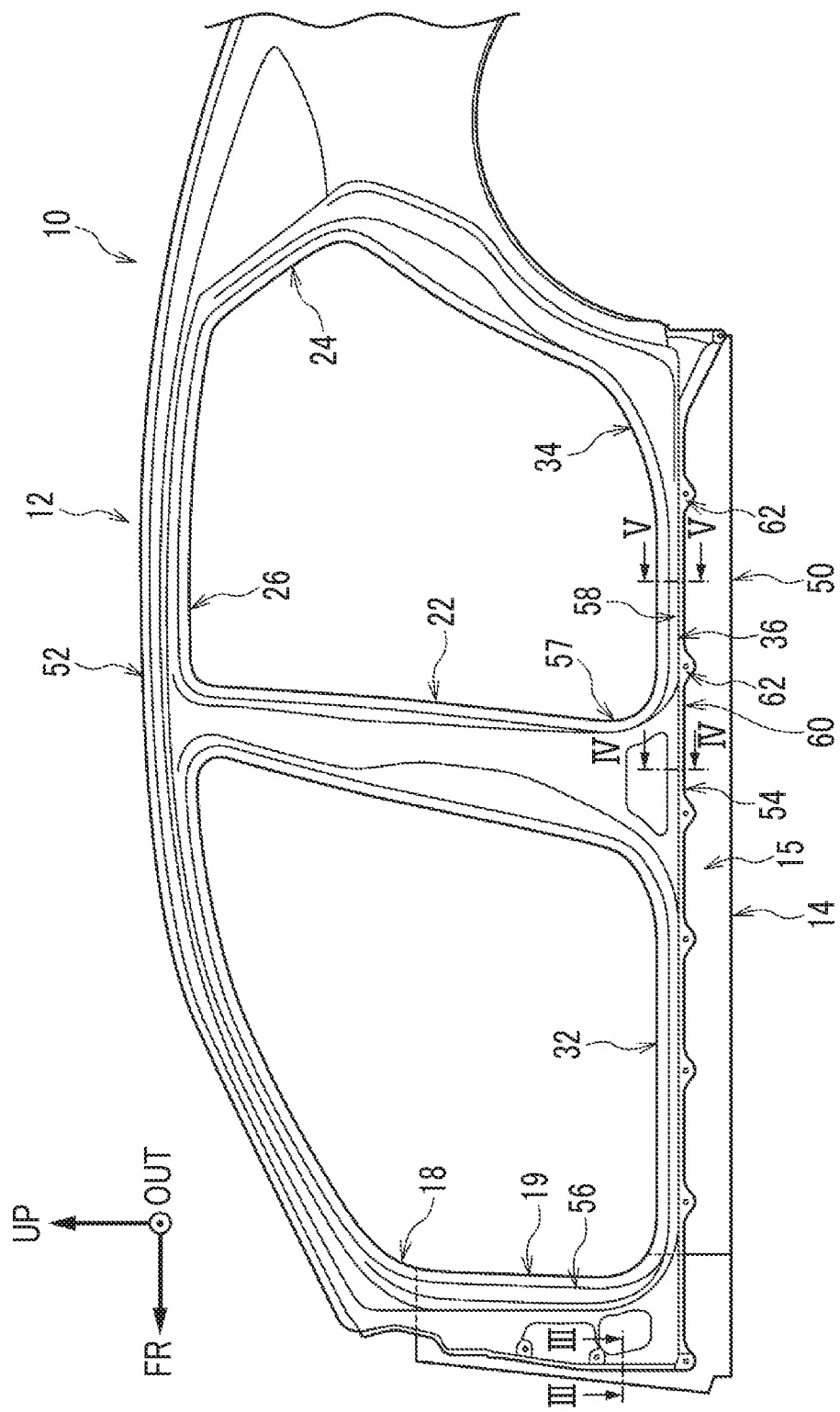
FIG. 1 is a configuration diagram illustrating a part of a vehicle to which a vehicle body structure according to a first embodiment is applied.

FIG. 1 is a diagram illustrating a state where a part of the vehicle 10 according to the first embodiment is seen in side view from the outside in the vehicle width direction. The arrows FR, UP, and OUT shown in the following drawings represent the forward direction (hereinafter, referred to as the "traveling direction") of the vehicle, the upward direction of the vehicle, and the vehicle width direction outside, respectively. Unless otherwise noted, the front and rear, the upper and lower sides, and the right and left in the following description refer to the front and rear in the front-rear direction of the vehicle, the upper and lower sides in the up-down direction of the vehicle, and the right and left in the width direction of the vehicle that is headed in the traveling direction, respectively.

The vehicle 10 has a vehicle body 12. The vehicle body 12 is configured to include a rocker panel 14, a front pillar 18, a center pillar 22, a rear pillar 24, a roof side rail 26, and the vehicle body structure 50.

Figure 2:
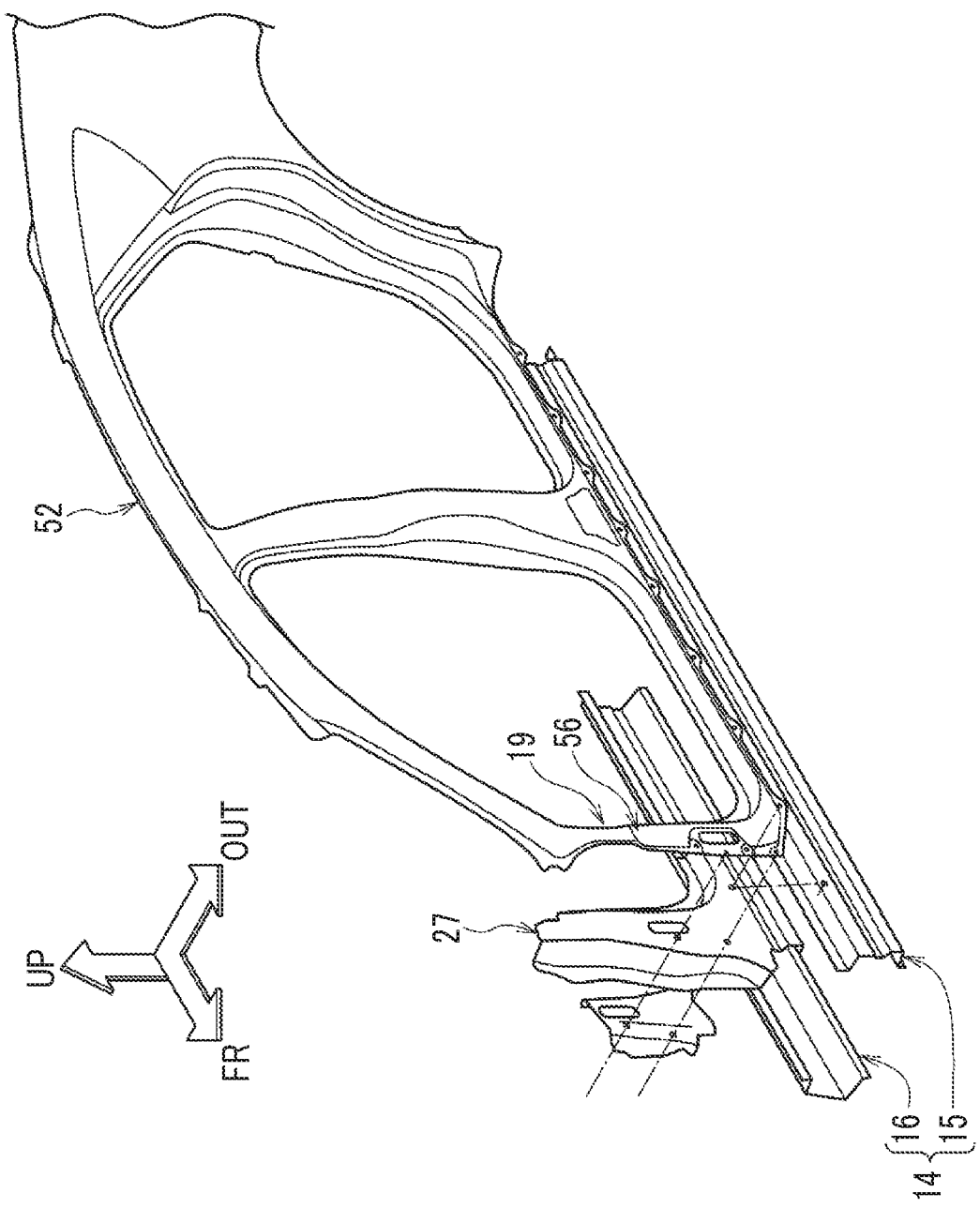
FIG. 2 is an exploded perspective view of a vehicle body according to the first embodiment.

The rocker panel 14 illustrated in FIG. 2 is elongated in the front-rear direction of the vehicle and constitutes a frame member at the outer end in the vehicle width direction in the lower portion of the vehicle in the up-down direction. When seen from the front-rear direction of the vehicle, the rocker panel 14 is configured such that a rocker outer panel 15 that has a hat shape that is open to the inside in the vehicle width direction in section and a rocker inner panel 16 that has a hat shape that is open to the vehicle width direction outside in section are joined to each other to form a closed section. The rocker outer panel 15 will be described in detail later.

The front pillar 18 illustrated in FIG. 1 extends to the upper side in the vehicle up-down direction with respect to the rocker panel 14 in the front portion of the vehicle body 12 in the vehicle front-rear direction. Specifically, the front pillar 18 has an upright part that is upright along the vehicle up-down direction from the rocker panel 14 and an inclined part that obliquely extends from the upper end of the upright part to the front end of the roof side rail 26 (described later). The upright part of the front pillar 18 (in the lower portion in the vehicle up-down direction) will be referred to as a hinge pillar 19.

The hinge pillar 19 illustrated in FIG. 2 is configured to include a front pillar lower reinforcement 27, a front pillar inner panel (not illustrated), and a hinge pillar portion 56 of a side member outer panel 52 (described later). The front pillar lower reinforcement 27 and the front pillar inner panel (not illustrated) form a closed section by being joined to each other in the vehicle width direction and constitute a part of the frame member of the vehicle 10.

The center pillar 22 illustrated in FIG. 1 extends to the upper side in the vehicle up-down direction with respect to the rocker panel 14 in a substantially middle portion of the vehicle body 12 in the vehicle front-rear direction. The rear pillar 24 extends to the upper side in the vehicle up-down direction with respect to the rocker panel 14 in the rear portion of the vehicle body 12 in the vehicle front-rear direction. The roof side rail 26 interconnects the upper portions of the front pillar 18, the center pillar 22, and the rear pillar 24 in the vehicle up-down direction and extends in the vehicle front-rear direction.

The rocker panel 14, the front pillar 18, the center pillar 22, and the roof side rail 26 form a front door opening portion 32 for an occupant to get in and out of the vehicle. In addition, the rocker panel 14, the center pillar 22, the rear pillar 24, and the roof side rail 26 form a rear door opening portion 34 for an occupant to get in and out of the vehicle. The front door opening portion 32 and the rear door opening portion 34 are opened and closed by doors (not illustrated). The part of the rear door opening portion 34 that constitutes the lower portion of the vehicle will be referred to as a rear door opening lower edge portion 36.

Figure 3:
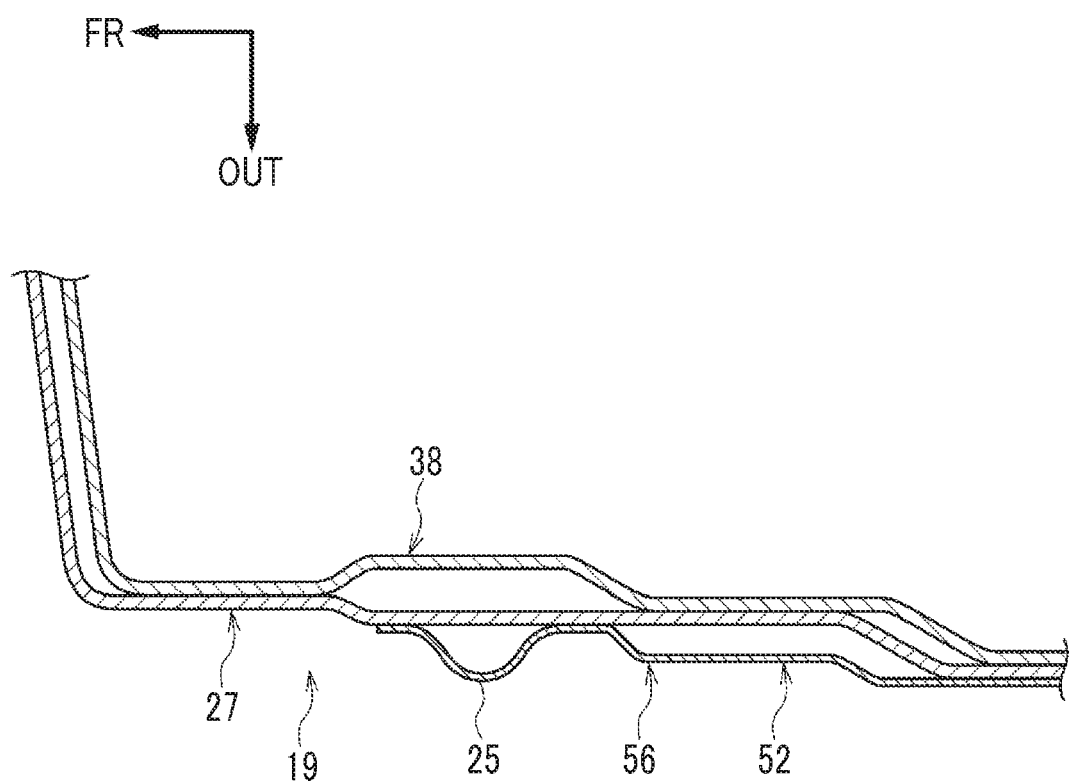
FIG. 3 is a cross-sectional view (sectional view taken along line III-III of FIG. 1) of the vehicle body according to the first embodiment.

A cross section (section taken along line III-III of FIG. 1) of the part of the hinge pillar 19 that is not fastened is illustrated in FIG. 3. In the hinge pillar 19, the front pillar lower reinforcement 27 overlaps a front pillar lower retainer 38 from the vehicle width direction outside. Furthermore, in this structure, the hinge pillar portion 56 of the side member outer panel 52 overlaps the front pillar lower reinforcement 27 from the vehicle width direction outside. A rib 25 protruding toward the vehicle width direction outside is formed in the front end portion of the hinge pillar portion 56. The side member outer panel 52 will be described in detail later.

Figure 4:
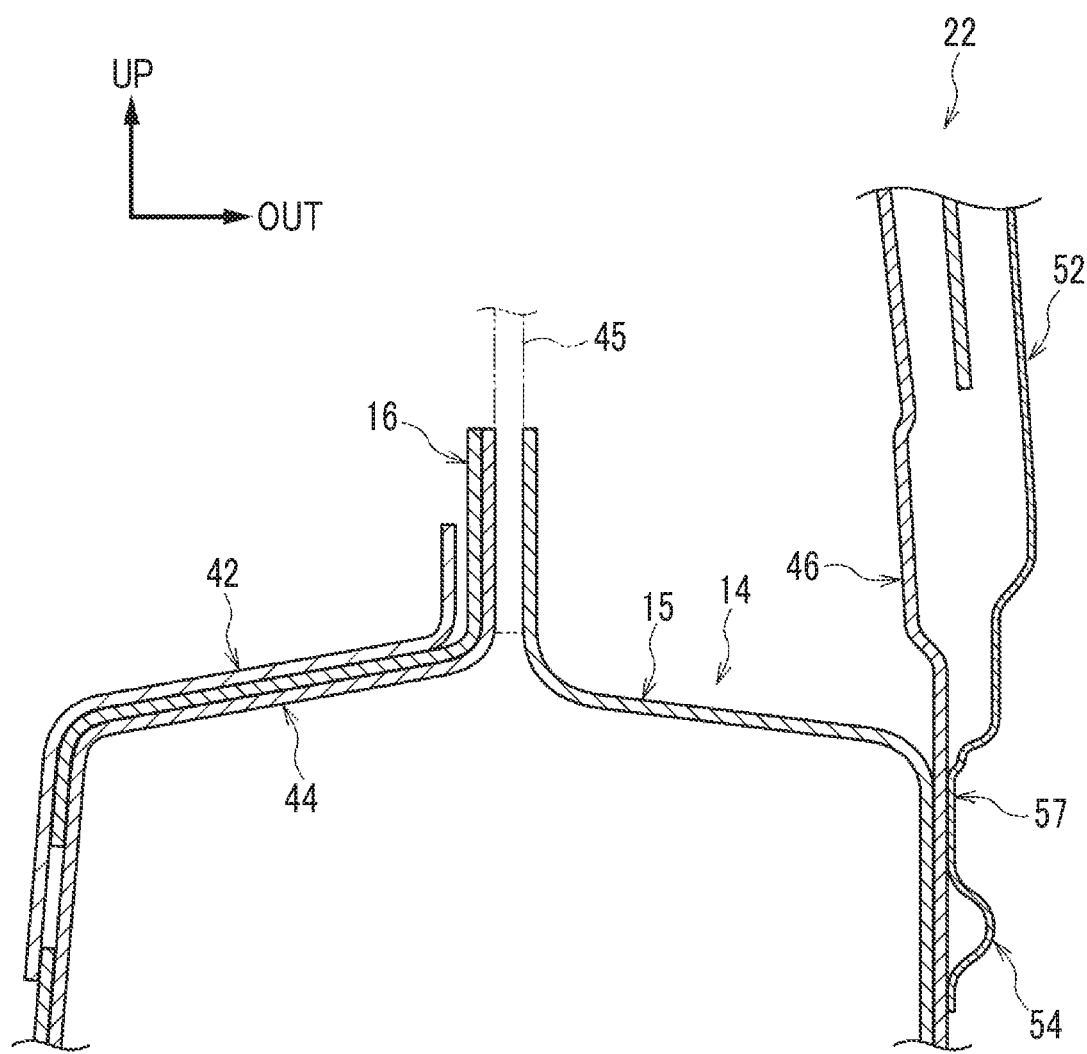
FIG. 4 is a longitudinal sectional view (sectional view taken along line IV-IV of FIG. 1) of the vehicle body according to the first embodiment.

A longitudinal section (section taken along line IV-IV of FIG. 1) of the part of the lower portion of the center pillar 22 that is not fastened is illustrated in FIG. 4. In the lower portion of the center pillar 22, a center pillar inner panel 42 and a rocker inner rear panel 44 overlap the rocker inner panel 16 in the vehicle width direction. The rocker inner rear panel 44 is joined to the rocker outer panel 15 via an inner panel 45.

When seen from the vehicle front-rear direction, a center pillar reinforcement 46 overlaps the rocker outer panel 15 from the vehicle width direction outside. Furthermore, in this structure, a center pillar lower portion 57 of the side member outer panel 52 overlaps the center pillar reinforcement 46 from the vehicle width direction outside. A rib 54 protruding toward the vehicle width direction outside is formed in the lower end portion of the center pillar lower portion 57. The rib 54 will be described in detail later.

The vehicle body structure 50 will be described below.

Figure 5:
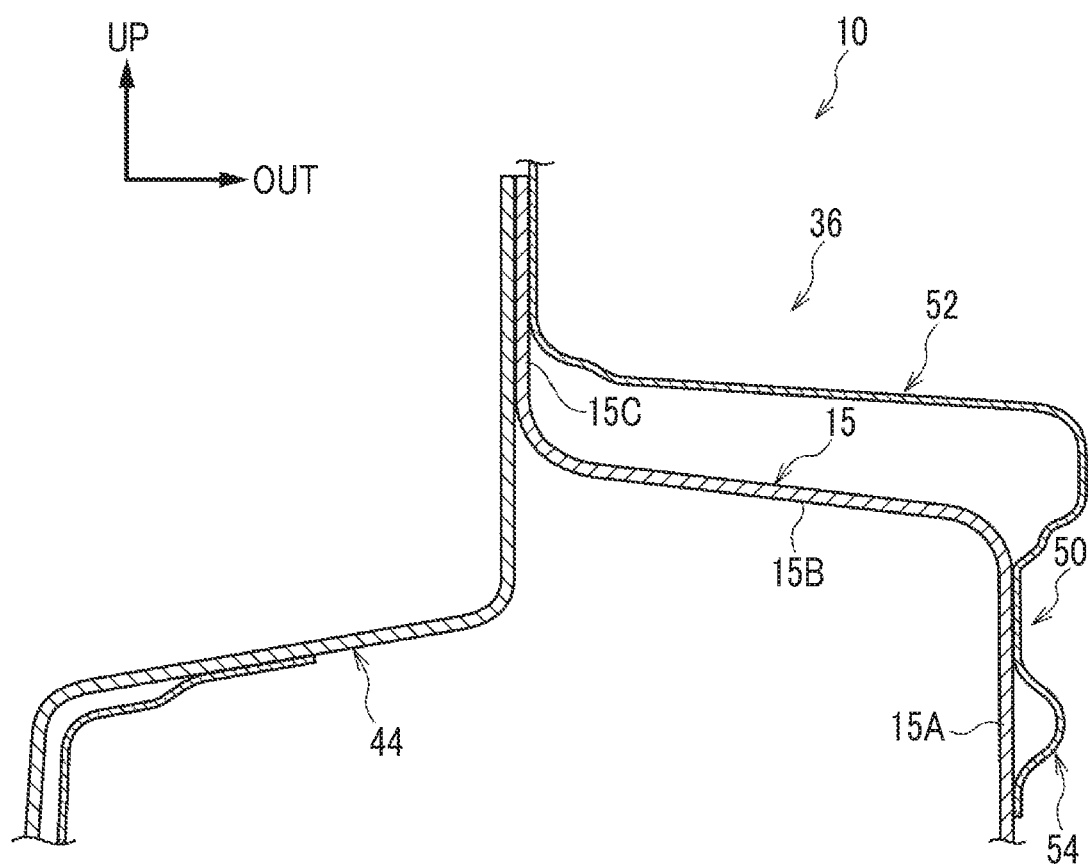
FIG. 5 is a longitudinal sectional view (sectional view taken along line V-V of FIG. 1) of the vehicle body according to the first embodiment.

The vehicle body structure 50 illustrated in FIG. 5 is applied to, for example, the rear door opening lower edge portion 36. Specifically, the vehicle body structure 50 has the rocker outer panel 15 as an example of a first structural member, the side member outer panel 52 as an example of a second structural member, and the rib 54 as an example of a ridge portion. The vehicle body structure 50 is configured to be symmetrical with respect to the middle of the vehicle 10 in the vehicle width direction. Accordingly, the vehicle left side part of the vehicle body structure 50 will be described with description of the vehicle right side part of the vehicle body structure 50 omitted.

When seen from the vehicle front-rear direction, the rocker outer panel 15 is configured to include a vertical wall portion 15A extending in the vehicle up-down direction, an upper wall portion 15B extending to the vehicle width direction inside from the upper end of the vertical wall portion 15A, and an extending portion 15C extending to the upper side from the end portion of the upper wall portion 15B that is on the vehicle width direction inside. In other words, the vertical wall portion 15A, the upper wall portion 15B, and the extending portion 15C are formed in the rocker outer panel 15. The vertical wall portion 15A is an example of a joined portion where the side member outer panel 52 is fastened (example of joining). A part of the rocker inner rear panel 44 is joined by welding to the extending portion 15C.

The rocker outer panel 15 is, for example, made of iron and has a linear expansion coefficient $K1=12.1\times10^{-6}/°$ C. as an example of a first linear expansion coefficient. In the present embodiment, the value of the linear expansion coefficient is a value measured by a method according to JIS H 7404-1993.

Figure 7A:
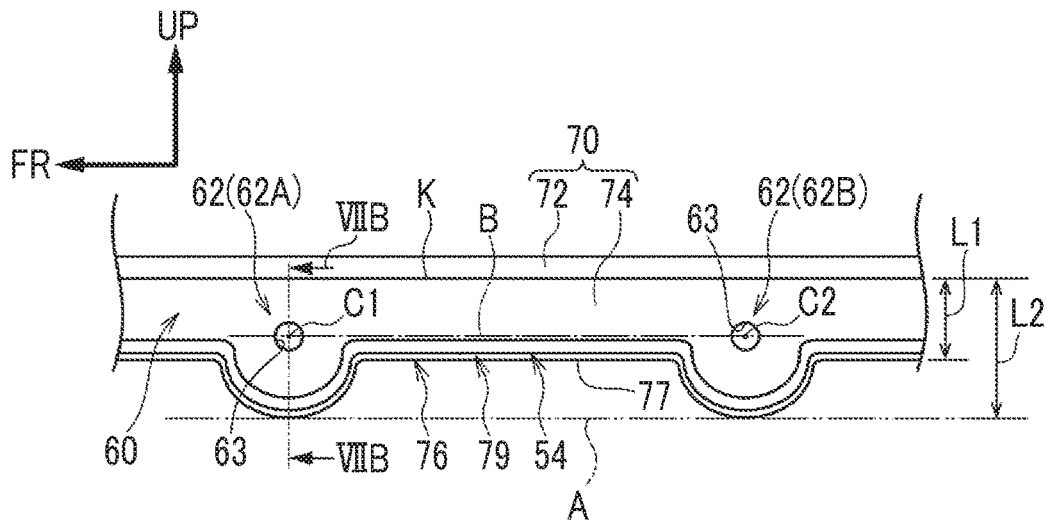
FIG. 7A is an explanatory diagram illustrating a fastening section of the side member outer panel according to the first embodiment.
Figure 7B:
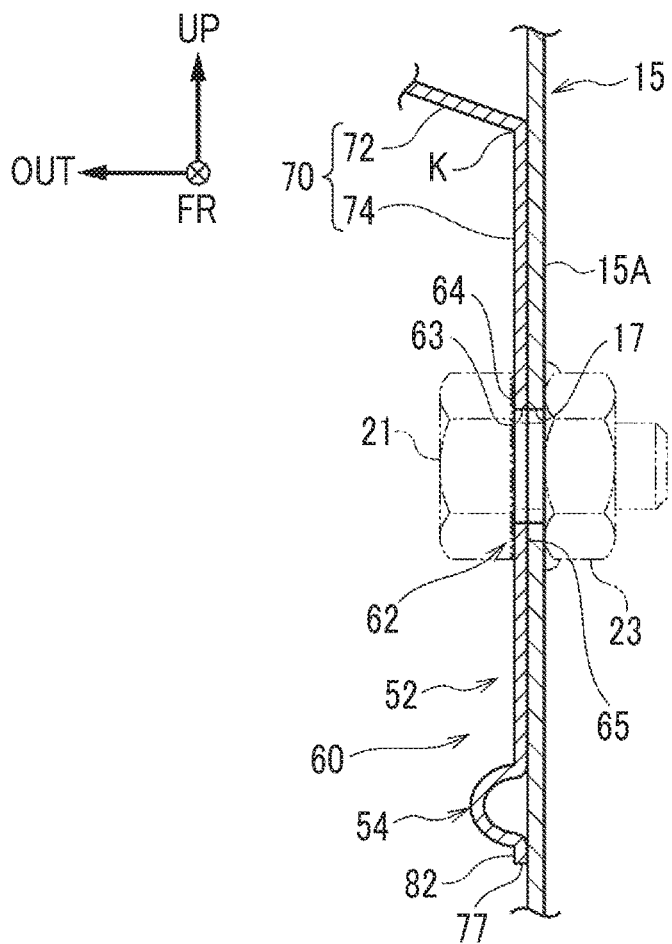
FIG. 7B is a longitudinal sectional view (sectional view taken along line VIIB-VIIB of FIG. 7A) of the fastening portion of the side member outer panel according to the first embodiment.

As illustrated in FIG. 7B, a through hole 17 is formed to penetrate the vertical wall portion 15A of the rocker outer panel 15 in the vehicle width direction. A plurality of the through holes 17 is formed to be spaced apart from each other in the vehicle front-rear direction in accordance with the positions of a plurality of fastening portions 62 (described later) of the side member outer panel 52. A weld nut 23 is disposed in the edge portion of the through hole 17 that is on the vehicle width direction inside. A bolt 21 is fastened to the weld nut 23.

The side member outer panel 52 illustrated in FIG. 1 is a large member in which parts constituting respective parts of the rocker panel 14, the front pillar 18, the center pillar 22, the rear pillar 24, and the roof side rail 26 are integrated by press molding. The side member outer panel 52 is a member constituting the outer plate and the design surface of the vehicle 10.

The side member outer panel 52 is, for example, made of aluminum and has a linear expansion coefficient $K2=23.0\times10^{-6}/°$ C. as an example of a second linear expansion coefficient. In other words, the second linear expansion coefficient $K2$ of the side member outer panel 52 exceeds the first linear expansion coefficient $K1$ of the rocker outer panel 15.

The part of the side member outer panel 52 that constitutes the side below the middle of the center pillar 22 in the vehicle up-down direction will be referred to as the center pillar lower portion 57. The part of the side member outer panel 52 that constitutes the rear door opening lower edge portion 36 will be referred to as an opening lower edge portion 58.

The part of the hinge pillar portion 56 ahead of the middle of the vehicle in the front-rear direction, the part of the center pillar lower portion 57 below the middle of the vehicle in the up-down direction, and the part of the opening lower edge portion 58 below the middle of the vehicle in the up-down direction will be collectively referred to as an outer edge portion 60. In other words, the outer edge portion 60 is the part that includes the part and the end portion of each part of the side member outer panel 52 which are outside the middle of the vehicle in the front-rear direction or the vehicle in the up-down direction. In the present embodiment, the outer edge portion 60 of the opening lower edge portion 58 will be described. Description of the outer edge portions 60 of the hinge pillar portion 56 and the center pillar lower portion 57 will be omitted since the outer edge portions 60 of the hinge pillar portion 56 and the center pillar lower portion 57 are almost the same in configuration as the outer edge portion 60 of the opening lower edge portion 58.

Figure 6:
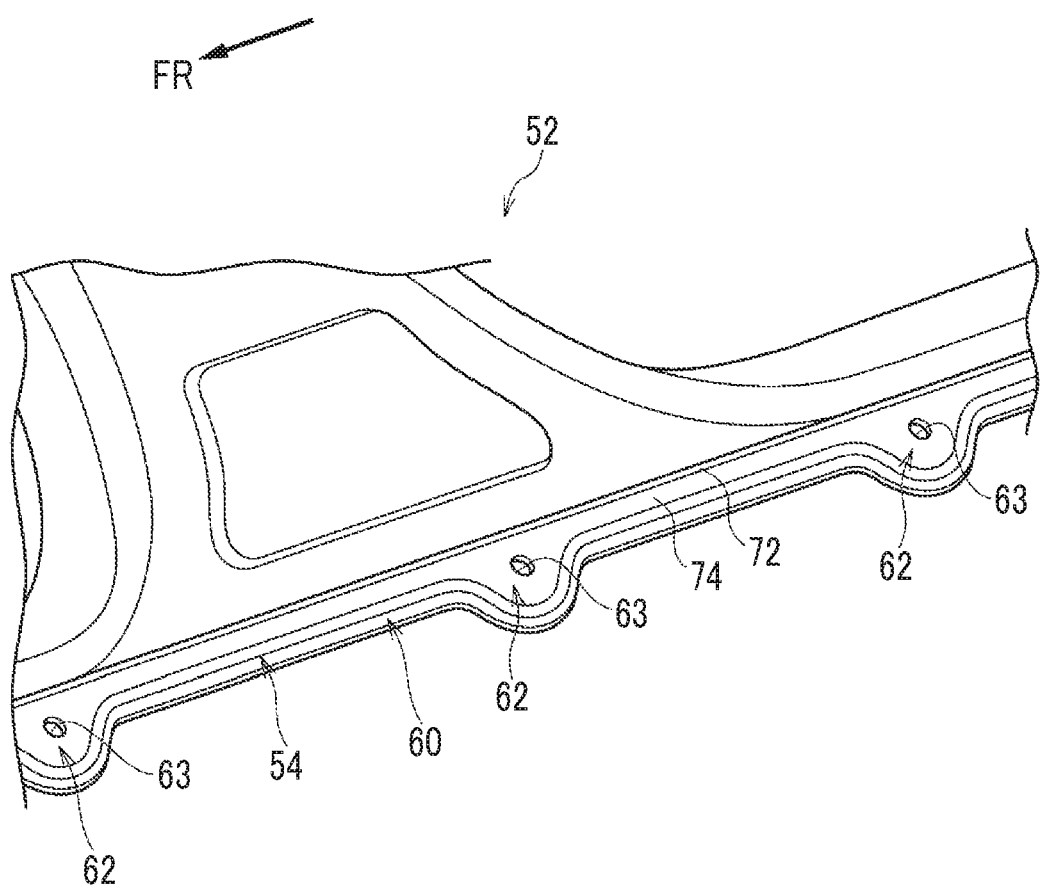
FIG. 6 is a perspective view illustrating a part of a side member outer panel according to the first embodiment.

As illustrated in FIG. 6, the fastening portions 62 are formed to be spaced apart in the vehicle front-rear direction in the outer edge portion 60. The fastening portions 62 are an example of a plurality of joining portions and are parts fastened (joined) to the vertical wall portion 15A (refer to FIG. 7B).

The fastening portion 62 illustrated in FIG. 7B is configured as a part including a through hole 63 penetrating the outer edge portion 60 of the side member outer panel 52 in the vehicle width direction (plate thickness direction) and a peripheral edge portion 64 of the through hole 63. The penetration direction of the through hole 63 is an example of the plane intersection (plane perpendicular) direction of the outer edge portion 60. The peripheral edge portion 64 is the part that overlaps a second wall 74 (described later) in a case where the head portion of the bolt 21 is projected in the vehicle width direction on the second wall 74. The surface of the peripheral edge portion 64 that is on the side where the side member outer panel 52 is in contact with the vertical wall portion 15A will be referred to as a fastening surface 65. The fastening surface 65 is an example of a joining surface. The in-plane direction of the fastening surface 65 is along, for example, the front-rear direction of the vehicle and the up-down direction of the vehicle. The plane intersection direction of the fastening surface 65 is a direction intersecting with the in-plane direction of the fastening surface 65 and includes the vehicle width direction.

The outer edge portion 60 has a flange portion 70 formed at the outer end (upper end in the vehicle up-down direction). When seen from the vehicle front-rear direction, the flange portion 70 has, for example, a first wall 72 and the second wall 74.

The first wall 72 extends to the side away from the rocker outer panel 15. Specifically, the first wall 72 is an inclined wall obliquely extending from the surface of the rocker outer panel 15 that is on the vehicle width direction outside such that the upper side in the vehicle up-down direction is positioned outside the lower side in the vehicle width direction.

The second wall 74 is formed in a flat plate shape and extends along the rocker outer panel 15 from a ridge line K bordering the first wall 72 toward the outside in an intersection direction (such as an orthogonal direction) intersecting with the ridge line K (extension direction of the ridge line K). Here, as an example, the extension direction of the ridge line K is substantially the vehicle front-rear direction. The intersection direction is the vehicle up-down direction. The outside in the intersection direction is the lower side in the vehicle up-down direction. When seen from the vehicle width direction, the length of the second wall 74 from the ridge line K to the outer end in the intersection direction is, for example, longer than the length that corresponds to the first wall 72 (length of the vehicle in the up-down direction).

As exemplified in FIG. 7A, the fastening portions 62 are formed to be spaced apart from each other in the vehicle front-rear direction in the second wall 74. The part of the second wall 74 that is between the fastening portions 62 in the vehicle front-rear direction will be referred to as a non-fastening portion 76.

The non-fastening portion 76 is the part of the second wall 74 that is displaced to the ridge line K side from an imaginary line A as a straight line representing a virtual outline interconnecting the intersection-direction tips of the fastening portions 62 (part recessed in the intersection direction toward the ridge line K). For example, when seen from the vehicle width direction (plane intersection (plane perpendicular) direction of the outer edge portion 60), the non-fastening portion 76 is formed in a shape such that the hypotenuse of an isosceles trapezoid that has the ridge line K side as the upper bottom and the imaginary line A side as the lower bottom has an arc shape. The maximum displacement (recess) length is L2−L1 when the intersection-direction length from the ridge line K to an end surface 77 of the non-fastening portion 76 is L1 and the intersection-direction length from the ridge line K to the outer end (imaginary line A) of the fastening portion 62 is L2. By the non-fastening portion 76 being formed in the outer edge portion 60 as described above, the intersection-direction length between the fastening portions 62 is shorter than the intersection-direction length of the fastening portions 62.

The non-fastening portion 76 being formed means in other words that the part where the fastening portions 62 are formed is a protruding portion (tab) more protruding to the outside than the other part in the second wall 74. When the second wall 74 is seen from the vehicle width direction, the part where the fastening portions 62 are formed is, for example, formed in a semicircular shape about the through hole 63.

As illustrated in FIG. 7B, the rib 54 is formed in the outer edge portion 60 of the side member outer panel 52 to protrude to the outside in the plane intersection direction (such as the plane perpendicular direction and the vehicle width direction) intersecting with the fastening surface 65 (refer to FIG. 7B). The rib 54 is formed at the part of the second wall 74 that is on the side opposite to the ridge line K side in the in-plane direction (vehicle up-down direction) with respect to the fastening portion 62. When seen from the vehicle front-rear direction, the rib 54 has, for example, a semi-cylindrical shape. The width of the rib 54 in the vehicle up-down direction is, for example, set to a width shorter than the length corresponding to the diameter of the through hole 63.

As illustrated in FIG. 7A, when it comes to the two fastening portions 62 that are next to each other in the vehicle front-rear direction, the fastening portion 62 that is on the front side in the vehicle front-rear direction will be referred to as a fastening portion 62A and the fastening portion 62 that is on the rear side in the vehicle front-rear direction will be referred to as the other fastening portion 62B. The rib 54 is continuous from the fastening portion 62A to the other fastening portion 62B. Specifically, when seen from the vehicle width direction, the rib 54 is continuously formed in a semi-cylindrical shape to surround the part outside the middle of the fastening portion 62 and is continuously formed in a straight line shape in an edge portion 79 as an outer end portion including the end surface 77 of the non-fastening portion 76. In other words, when seen from the plane intersection direction of the fastening surface 65 of the fastening portion 62, the rib 54 is connected (continuous) across the fastening sections of the fastening portions 62 in the intersection direction intersecting with the plane intersection direction.

The rib 54 is connected to, for example, the above-described rib 25 (refer to FIG. 3). In other words, the rib 54 is formed to be continuous to the rib 25. The sectional size of the rib 54 is set to at least a size allowing resistance to the thermal stress that acts in the extension direction of an imaginary line B interconnecting the fastening portion 62A and the other fastening portion 62B (vehicle front-rear direction) when the side member outer panel 52 is heated. The imaginary line B is a straight line interconnecting a center C1 of the through hole 63 in the fastening portion 62A and a center C2 of the through hole 63 in the other fastening portion 62B.

As illustrated in FIG. 7B, a flat portion 82 shorter than the width of the rib 54 is formed at the part that is outside the rib 54 in the in-plane direction of the second wall 74. Here, in a normal temperature (25° C.) environment in which the side member outer panel 52 and the rocker outer panel 15 are unheated, the flat portion 82 and the vertical wall portion 15A are in close contact with each other with little gap in the vehicle width direction. The state of the side member outer panel 52 and the rocker outer panel 15 at this time will be referred to as an unheated state.

The action and effect of the vehicle body structure 50 according to the first embodiment will be described. Refer to FIGS. 1, 2, 5, 6, 7A, and 7B regarding the description of the vehicle body structure 50.

In the vehicle body structure 50, the side member outer panel 52 is fastened (joined) to the rocker outer panel 15 by the fastening portions 62 being fastened to the vertical wall portion 15A.

The vehicle body structure 50 is put from the unheated state into a state of being heated to a high temperature of at least 100° C. in a drying treatment following electrodeposition painting. In the heated state, the second linear expansion coefficient K2 of the side member outer panel 52 exceeds the first linear expansion coefficient K of the rocker outer panel 15. Accordingly, the amount of deformation (expansion) of the side member outer panel 52 attributable to thermal stress exceeds the amount of deformation (expansion) of the rocker outer panel 15 attributable to thermal stress. As a result, the side member outer panel 52 floats up with respect to the rocker outer panel 15.

Especially, the bending moment that acts on the fastening portions 62 exceeds the bending moment that acts on the other part. Accordingly, the side member outer panel 52 floats up more in the peripheral portion of each fastening portion 62. At this time, a force acts on the side member outer panel 52 in the direction from the fastening portion 62A toward the other fastening portion 62B next to the fastening portion 62A (direction of the imaginary line B).

In the vehicle body structure 50, the rib 54 formed in the outer edge portion 60 to protrude in the plane intersection (plane perpendicular) direction is continuous from the fastening portion 62A to the other fastening portion 62B. Accordingly, the rib 54 resists the force that acts in the direction of the imaginary line B interconnecting the fastening positions of the fastening portions 62. In other words, in the vehicle body structure 50, rigidity with respect to the force that acts in the linear direction in which the fastening positions of the fastening portions 62 are interconnected is enhanced compared to a configuration lacking the continuous rib 54. Furthermore, the rib 54 also resists the bending moment acting on the fastening portions 62. As a result of the increase in rigidity and the resistance to the bending moment described above, deformation of the side member outer panel 52 in the vicinity of the fastening portions 62 is suppressed. In other words, floatation of the side member outer panel 52 can be suppressed.

In the vehicle body structure 50, the ridge line K part that forms the boundary between the first wall 72 and the second wall 74 as well as the rib 54 resists the force acting in the linear direction in which the fastening positions of the fastening portions 62 formed in the second wall 74 are interconnected. As a result, deformation of the side member outer panel 52 in the vicinity of the fastening portions 62 is suppressed, and thus floatation of the side member outer panel 52 can be suppressed.

Furthermore, in the vehicle body structure 50, the ridge line K part is formed on one side and the rib 54 is formed on the other side of the fastening portions 62 in the intersection direction. As a result, the part that resists the force acting in the direction of the imaginary line B is less likely to be biased than in a configuration in which the ridge line K part and the rib 54 are formed on one side in the intersection direction, and thus deformation of the side member outer panel 52 can be suppressed.

In addition, in the vehicle body structure 50, the part of the side member outer panel 52 that is between the fastening portions 62 is closer to the ridge line K than the tips of the fastening portions 62 by the non-fastening portion 76 being formed in the side member outer panel 52. In other words, the length L1 from the ridge line K to the edge at the unfastened part of the second wall 74 is shorter than the length L2 from the ridge line K to the edge in a configuration lacking the non-fastening portion 76, and thus floatation of the second wall 74 can be suppressed. In other words, floatation of the second wall 74 decreases as the length of the part of the second wall 74 that is deformed is shorter.

In the vehicle body structure 50, floatation of the aluminum side member outer panel 52 with respect to the iron rocker outer panel 15 is suppressed, and thus a decline in sealability (sealing properties) between the rocker outer panel 15 and the side member outer panel 52 can be suppressed.

Figure 8:
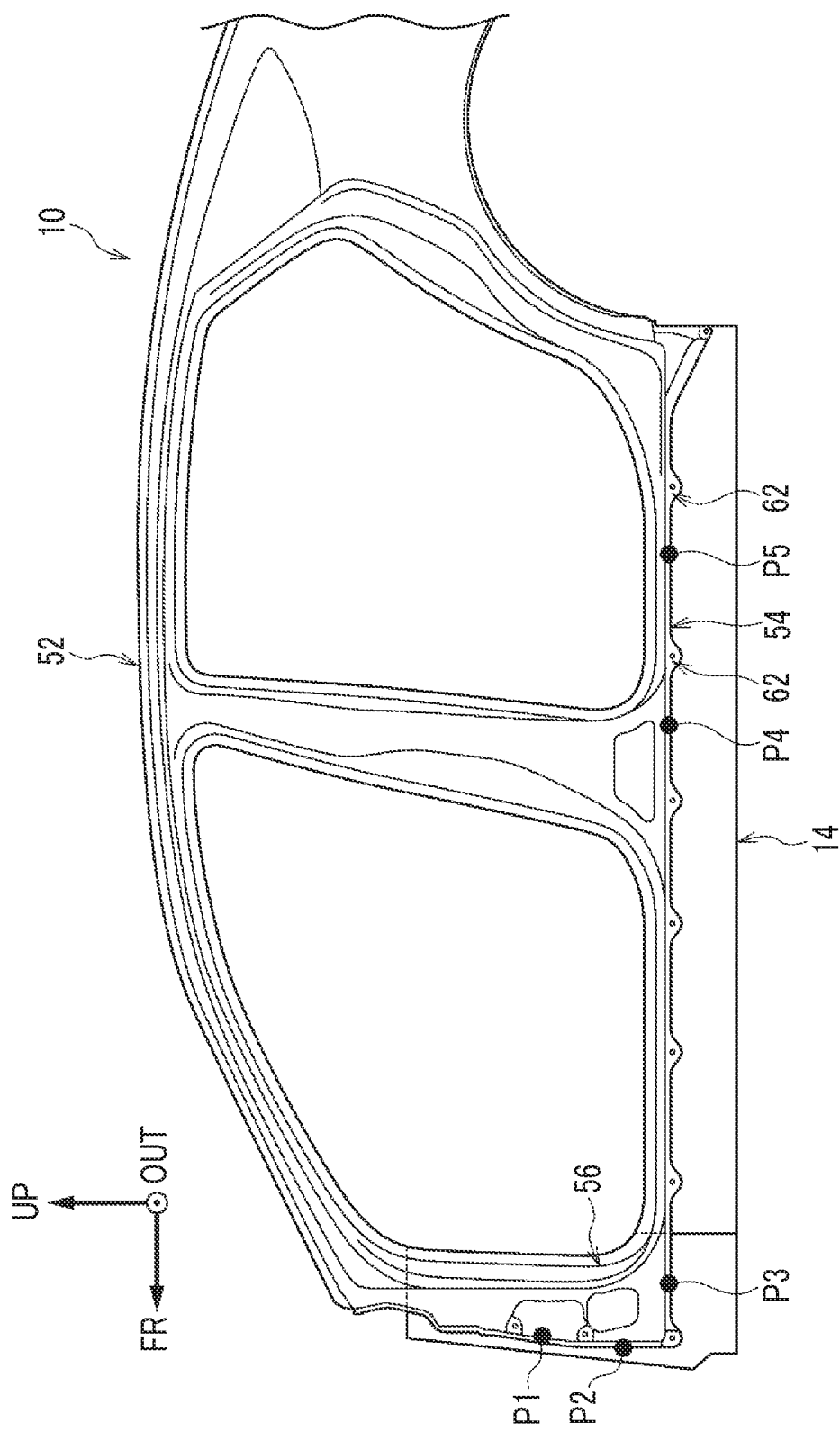
FIG. 8 is an explanatory diagram illustrating CAE analysis measurement positions in the vehicle body structure according to the first embodiment.

As schematically illustrated in FIG. 8, measurement points P1, P2, P3 were set in the hinge pillar portion 56, a measurement point P4 was set in the center pillar lower portion 57, and a measurement point P5 was set in the opening lower edge portion 58 in the side member outer panel 52. Then, computer aided engineering (CAE) analysis was performed with regard to the amount of floatation of the side member outer panel 52 with respect to each frame member in a case where the side member outer panel 52 is heated. The heating temperature was set to the temperature of the post-painting drying treatment (at least 100° C.). A vehicle body structure in which the rib 54 is separated in the fastening portions 62 was used as a vehicle body structure according to a comparative example with respect to the vehicle body structure 50 according to the present embodiment.

Figures 9, 10:
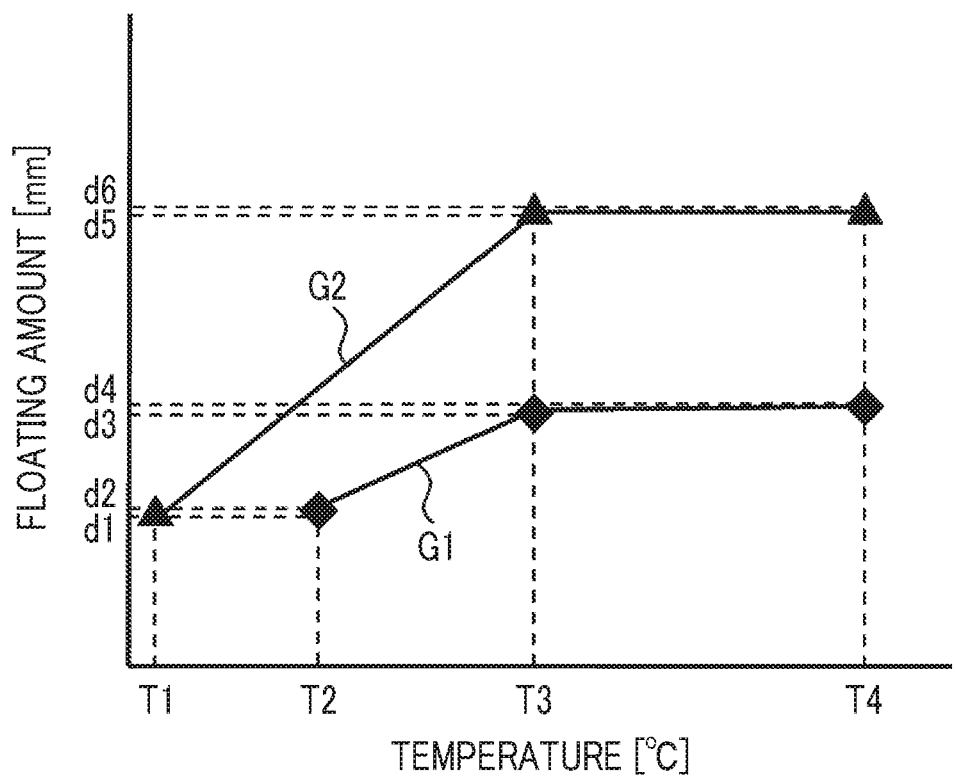
FIG. 9 is a table illustrating the result of CAE analysis-based floatation amount measurement regarding the vehicle body structure according to the first embodiment and a vehicle body structure according to a comparative example.
FIG. 10 is a graph illustrating a change in floatation amount at different temperatures regarding the vehicle body structure according to the first embodiment and the vehicle body structure according to the comparative example.

As illustrated in FIG. 9, it has been confirmed as a result of the CAE analysis that floatation of the side member outer panel 52 can be suppressed more in the vehicle body structure 50 (refer to FIG. 1) according to the present embodiment than in the vehicle body structure according to the comparative example at any of the measurement points P1, P2, P3, P4, P5.

Illustrated in FIG. 10 are graphs G1, G2 showing a change in the floatation amount [mm] of the side member outer panel 52 (refer to FIG. 1) at different temperatures [° C.] with regard to the vehicle body structure 50 (refer to FIG. 1) according to the present embodiment and the vehicle body structure according to the comparative example. The graph G1 shows the measurement result regarding the vehicle body structure 50 according to the present embodiment, and the graph G2 shows the measurement result regarding the vehicle body structure according to the comparative example. The height of the temperature is T1<T2<T3<T4. The floatation amount is d1<d2<d3<d4<d5<d6. d1 and d2 are substantially the same amounts, d3 and d4 are substantially the same amounts, and d5 and d6 are substantially the same amounts. As is apparent from the graph G1 and the graph G2, it has been confirmed that the floatation amount of the vehicle body structure 50 according to the present embodiment is smaller than the floatation amount of the vehicle body structure according to the comparative example even in a case where the temperature varies.

With the vehicle body structure 50, floatation of the side member outer panel 52 is suppressed with respect to each frame member, and thus the coatability of a sealer blocking the gap between the frame member and the side member outer panel 52 can be improved. Furthermore, with the vehicle body structure 50, floatation of the side member outer panel 52 is suppressed, and thus cracking of the sealer and cracking of the painting are suppressed and a decline in rust preventiveness is suppressed. Altogether, a poor appearance is suppressed.

A vehicle body structure 90 according to a second embodiment will be described. The same reference numerals as in the first embodiment described above will be used to refer to members and parts basically identical to those of the first embodiment and description thereof will be omitted.

Figure 12:
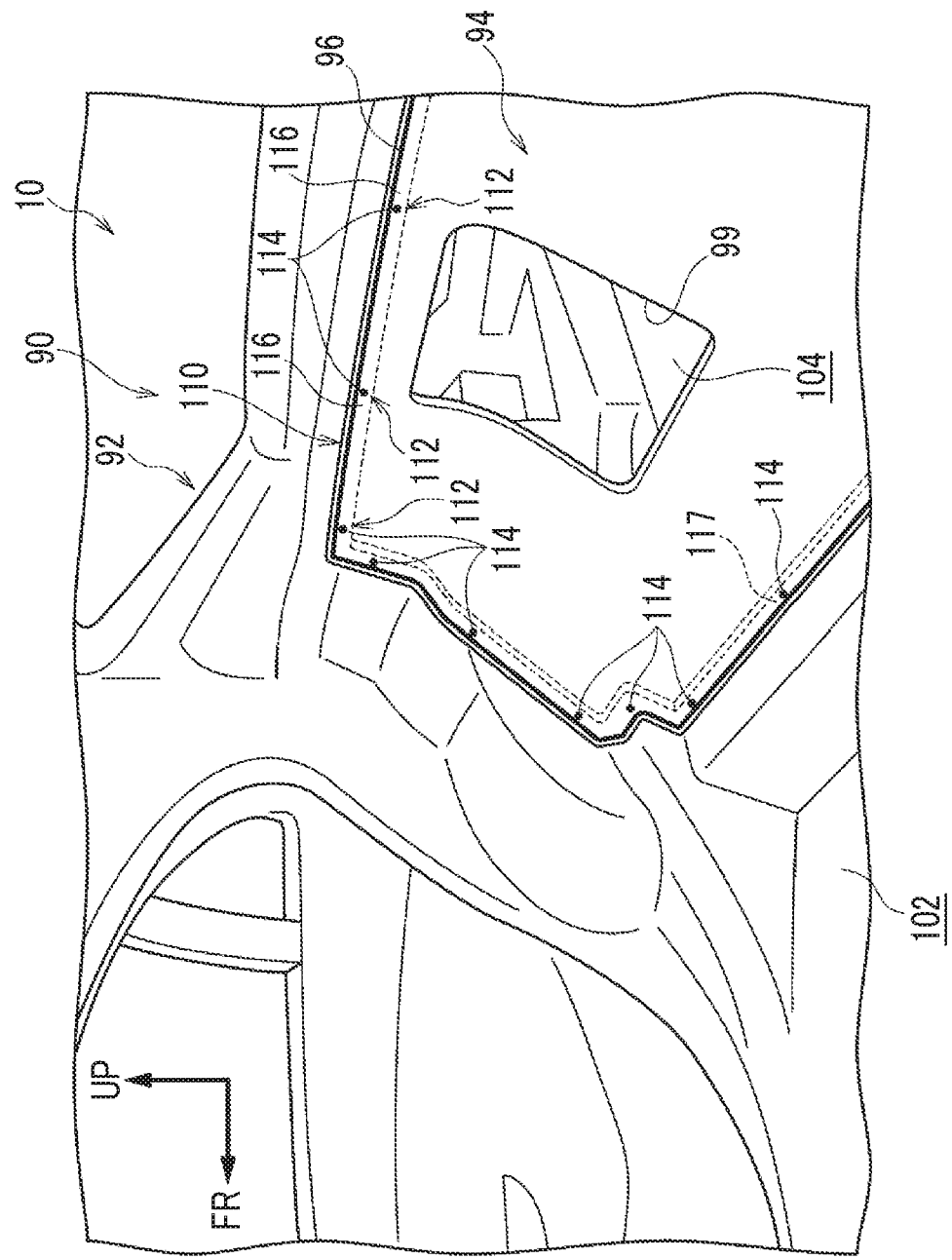
FIG. 12 is an explanatory diagram illustrating a state where the vehicle cabin and the luggage room according to the second embodiment are partitioned by a partition wall member.

The vehicle body structure 90 according to the second embodiment illustrated in FIG. 12 has a vehicle body rear portion member 92 as an example of the first structural member, a partition wall member 94 as an example of the second structural member, and a rib 96 as an example of the ridge portion.

Figure 11:
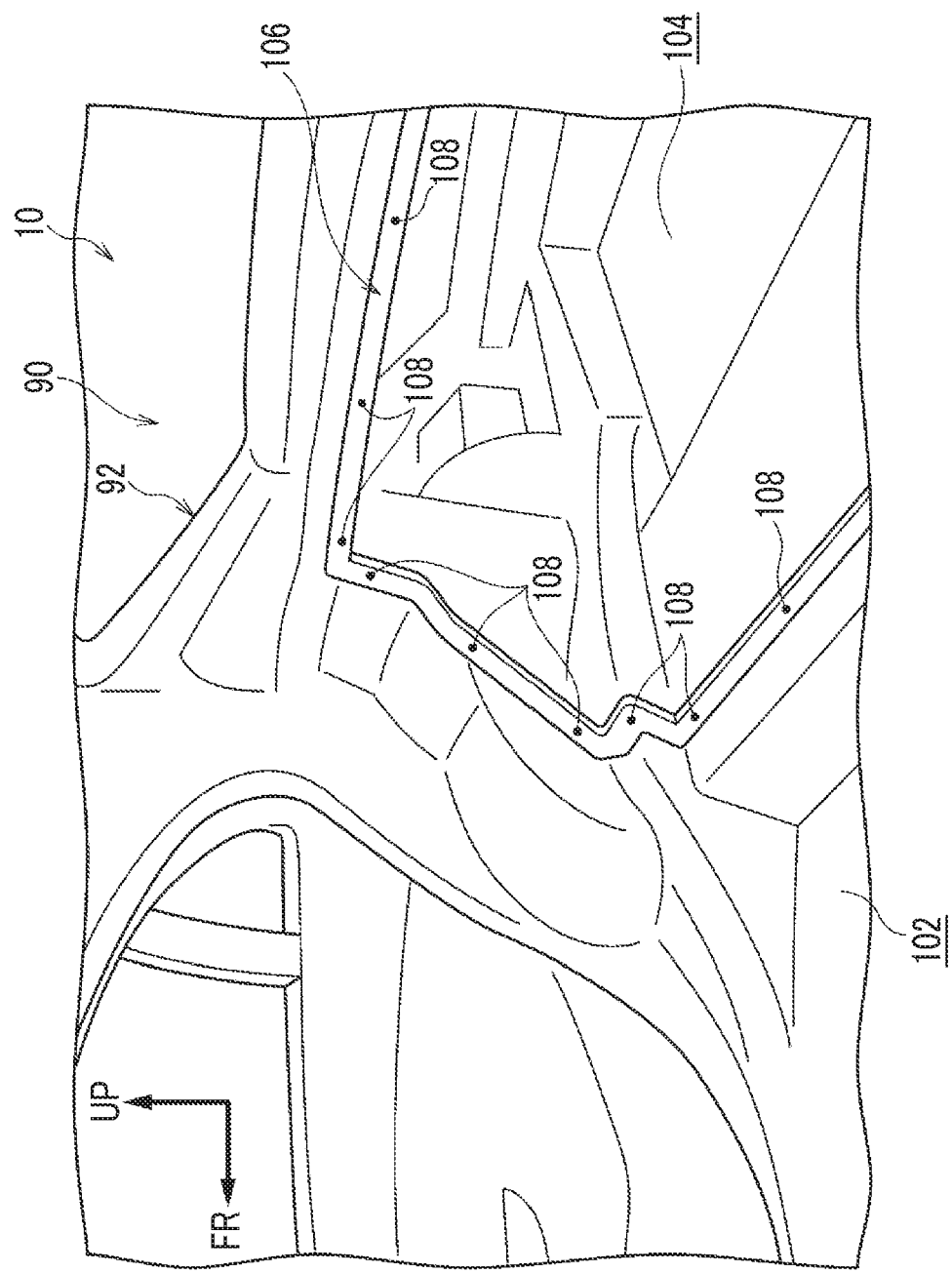
FIG. 11 is an explanatory diagram illustrating a vehicle cabin and a luggage room according to a second embodiment.

The vehicle body rear portion member 92 illustrated in FIG. 11 is, for example, made of iron and has the above-described first linear expansion coefficient K1. The vehicle body rear portion member 92 forms a vehicle cabin 102 and a luggage room 104 of the vehicle 10. Furthermore, a fastened portion 106 as an example of the joined portion is formed in the vehicle body rear portion member 92.

The fastened portion 106 is formed in an annular shape when seen from the vehicle front-rear direction at the part of the vehicle body rear portion member 92 that is the boundary between the vehicle cabin 102 and the luggage room 104. A plurality of through holes 108 is formed to be spaced apart in the circumferential direction in the fastened portion 106. Weld nuts (not illustrated) are disposed in the edge portions of the through holes 108 and on the luggage room 104 side. Bolts (not illustrated) are fastened to the weld nuts.

The partition wall member 94 illustrated in FIG. 12 is, for example, made of aluminum and has the above-described second linear expansion coefficient K2. When seen from the vehicle front-rear direction, the partition wall member 94 is formed in a substantially rectangular plate shape that has the vehicle up-down direction as the short direction thereof and has the vehicle width direction as the longitudinal direction thereof. A plurality of fastening portions 112 as an example of the joining portions is formed in accordance with the positions of the through holes 108 (refer to FIG. 11) in an outer edge portion 110 as the peripheral edge of the partition wall member 94. The fastening portions 112 are fastened (joined) to the fastened portion 106 (refer to FIG. 11) by means of bolts (not illustrated). An opening portion 99 is formed to penetrate the middle portion of the partition wall member 94 in the plate thickness direction thereof.

The fastening portion 112 is configured as a part including a through hole 114 penetrating the outer edge portion 110 of the partition wall member 94 in the plate thickness direction and a peripheral edge portion 116 of the through hole 114. The penetration direction of the through hole 114 is an example of the plane intersection (plane perpendicular) direction of the outer edge portion 110. The peripheral edge portion 116 is the part that overlaps the outer edge portion 110 in a case where the head portion of the bolt (not illustrated) fastened to the above-described weld nut is projected in the plane intersection direction. The surface of the peripheral edge portion 116 that is on the side where the partition wall member 94 is in contact with the fastened portion 106 (refer to FIG. 11) will be referred to as a fastening surface 117. The fastening surface 117 is an example of the joining surface. The plane intersection direction of the fastening surface 117 is a direction intersecting with the in-plane direction of the fastening surface 117.

The partition wall member 94 is fixed to the vehicle body rear portion member 92 by the fastening portions 112 of the partition wall member 94 overlapping the fastened portion 106 (refer to FIG. 11) from the front side in the vehicle front-rear direction and the bolt (not illustrated) being inserted into the through hole 114 and the through hole 108 (refer to FIG. 11) and fastened to the weld nut. The partition wall member 94 fixed to the vehicle body rear portion member 92 partitions the vehicle cabin 102 and the luggage room 104 from each other.

The rib 96 is formed in the outer edge portion 110 of the partition wall member 94 to protrude toward the outside (vehicle cabin 102 side) in the plane intersection direction (such as the plane perpendicular direction) intersecting with the fastening surface 117. When seen from the vehicle front-rear direction, the rib 96 is formed, for example, in a rectangular frame shape. In other words, the rib 96 is continuous (connected) from a fastening portion 112 to the other fastening portion 112 with respect to the fastening portions 112. Furthermore, the rib 96 is disposed outside the fastening portions 112 in the outer edge portion 110. In other words, when seen from the plane intersection direction of the fastening surface 117 of the fastening portion 112, the rib 96 is connected (continuous) across the fastening sections of the fastening portions 112 in the intersection direction intersecting with the plane intersection direction.

The action and effect of the vehicle body structure 90 according to the second embodiment will be described.

In the vehicle body structure 90 illustrated in FIG. 12, the partition wall member 94 is fixed to the vehicle body rear portion member 92 by the fastening portions 112 being fastened to fastened portion 106 (refer to FIG. 11).

The vehicle body structure 90 is put from the unheated state into a state of being heated to a high temperature of at least 100° C. in a drying treatment following electrodeposition painting. In the heated state, the second linear expansion coefficient K2 of the partition wall member 94 exceeds the first linear expansion coefficient K1 of the vehicle body rear portion member 92. Accordingly, the amount of deformation (expansion) of the partition wall member 94 attributable to thermal stress exceeds the amount of deformation (expansion) of the vehicle body rear portion member 92 attributable to thermal stress. As a result, the partition wall member 94 floats up with respect to the vehicle body rear portion member 92.

Especially, the bending moment that acts on the fastening portions 112 exceeds the bending moment that acts on the other part. Accordingly, the partition wall member 94 floats up more in the peripheral portion of each fastening portion 112. At this time, a force acts on the partition wall member 94 in the direction from the fastening portion 112 toward the other fastening portion 112 next to the fastening portion 112.

In the vehicle body structure 90, the rib 96 formed in the outer edge portion 110 to protrude in the plane intersection (plane perpendicular) direction is continuous from the fastening portion 112 to the other fastening portion 112. Accordingly, the rib 96 resists the force that acts in the linear direction in which the fastening positions of the fastening portions 112 are interconnected. In other words, in the vehicle body structure 90, rigidity with respect to the force that acts in the linear direction in which the fastening positions of the fastening portions 112 are interconnected is enhanced compared to a configuration lacking the continuous rib 96. Furthermore, the rib 96 also resists the bending moment acting on the fastening portions 112. As a result of the increase in rigidity and the resistance to the bending moment described above, deformation of the partition wall member 94 in the vicinity of the fastening portions 112 is suppressed. In other words, floatation of the partition wall member 94 can be suppressed.

In the vehicle body structure 90, floatation of the aluminum partition wall member 94 with respect to the iron vehicle body rear portion member 92 is suppressed, and thus a decline in sealability (sealing properties) between the vehicle body rear portion member 92 and the partition wall member 94 can be suppressed.

The disclosure is not limited to the embodiments described above.

The vehicle body structure 50 may also be a vehicle body structure without the flange portion 70 in which a plate-shaped portion formed in the outer edge portion 60 is overlapped and fastened. In the vehicle body structure 50, the rib 54 may also be disposed between the fastening portion 62 and the ridge line K. The non-fastening portion 76 may not be formed in the vehicle body structure 50.

The vehicle body structure 90 may have the flange portion 70 that has the first wall 72 and the second wall 74. In the vehicle body structure 90 that has the flange portion 70, the rib 96 may be formed at the part that is on the side opposite to the ridge line K side with respect to the fastening portion 112. Furthermore, in the vehicle body structure 90 that has the flange portion 70, the rib 96 may be formed to be continuous to the edge portion of the non-fastening portion 76 by the non-fastening portion 76 being formed between the fastening portions 112.

The vehicle body structure 50, 90 may also be applied to the other parts of the vehicle 10 without being limited to the application to the rear door opening lower edge portion 36 and the vehicle body rear portion. For example, the vehicle body structure 50, 90 may be applied to the lower portions of the hinge pillar 19 and the center pillar 22. The vehicle 10 may have the vehicle body structure 50 and the vehicle body structure 90.

The joining portion is not limited to the part that has a through hole and is joined by fastening of fastening means such as bolt and a nut as in the case of the fastening portion 62 and the fastening portion 112. The joining portion may also be a part joined (attached) by joining means such as welding being used. For example, the joining portion may be joined by means of a self-pierce rivet (SPR) and a flow drill screw (FDS). The joining surface may be a second structural member side surface in the joining portion where the first structural member and the second structural member are joined to each other and is not limited to the fastening surface 65, 117.

The rib 54 may not be continuous to the rib 25. The rib 54 may be continuous with respect to the (two or more) fastening portions 62. The rib 54 and the rib 96 are not limited to ribs that have a semi-cylindrical sectional shape when seen from the extension direction (round ribs) and may also have a polygonal sectional shape.

The combination between materials that have different linear expansion coefficients is not limited to the combination between iron and aluminum and may also be a combination between iron and an aluminum alloy or another metal or a metal and resin.

Although an example of the vehicle body structure according to the embodiments and the modification examples of the disclosure has been described above, it is a matter of course that these embodiments and modification examples may also be used through appropriate combination and can be implemented in various aspects without deviating from the scope of the disclosure.

What is claimed is:
1. A vehicle body structure comprising:
a first structural member having a first linear expansion coefficient and provided with a joined portion;
a second structural member having a second linear expansion coefficient exceeding the first linear expansion coefficient and provided with a plurality of joining portions at an outer edge portion of the second structural member, the joining portions being joined to the joined portion; and
a ridge portion formed in the outer edge portion to protrude in a plane intersection direction intersecting with a joining surface of the joining portion, the ridge portion being continuous from one of the joining portions to another one of the joining portions.

2. The vehicle body structure according to claim 1, wherein:
the outer edge portion has a flange portion having a first wall and a second wall, the first wall extending to a side away from the first structural member, the second wall extending along the first structural member from a ridge line bordering the first wall toward an outside in an intersection direction intersecting with the ridge line; and
the joining portions are formed in the second wall.

3. The vehicle body structure according to claim 2, wherein the ridge portion is formed at a part on an opposite side of the joining portion in the second wall from the ridge line.

4. The vehicle body structure according to claim 3, wherein:
a part of the second wall between the joining portions is displaced to the ridge line side from a straight line interconnecting tips of the joining portions; and
the ridge portion is formed to be continuous to an edge portion of the part displaced to the ridge line side.

5. The vehicle body structure according to claim 1, wherein:
   the first structural member is an iron frame member; and
   the second structural member is an aluminum side member outer panel.

6. The vehicle body structure according to claim 1, wherein:
   the first structural member is an iron vehicle body rear portion member forming a vehicle cabin and a luggage room; and
   the second structural member is an aluminum partition wall member partitioning the vehicle cabin and the luggage room from each other.

* * * * *

UNITED STATES PATENT AND TRADEMARK OFFICE
CERTIFICATE OF CORRECTION

PATENT NO. : 10,589,791 B2
APPLICATION NO. : 16/114814
DATED : March 17, 2020
INVENTOR(S) : Soshiro Murata et al.

It is certified that error appears in the above-identified patent and that said Letters Patent is hereby corrected as shown below:

On the Title Page

Item (72), inventors, inventor 1, address, delete "Nagoya" and insert --Nagoya-shi Aichi-ken--, therefor.

Item (72), inventors, inventor 2, address, delete "Miyoshi" and insert --Miyoshi-shi Aichi-ken--, therefor.

Item (72), inventors, inventor 3, address, delete "Inazawa" and insert --Inazawa-shi Aichi-ken--, therefor.

Item (72), inventors, inventor 4, address, delete "Toyota" and insert --Toyota-shi Aichi-ken--, therefor.

In the Specification

In Column 9, Line 49, delete "K" and insert --K1--, therefor.

Signed and Sealed this
Twelfth Day of May, 2020

Andrei Iancu
*Director of the United States Patent and Trademark Office*